C. BOOTH & A. C. PAGE.
DEMOUNTABLE WIRE WHEEL.
APPLICATION FILED SEPT. 8, 1914.

1,220,314.

Patented Mar. 27, 1917.
2 SHEETS—SHEET 1.

WITNESSES
A. LeRoy Dietrich
Marjory D. Graf

Clement Booth
Alfred Charles Page  INVENTORS

BY
Charles N. Butler
ATTORNEY

C. BOOTH & A. C. PAGE.
DEMOUNTABLE WIRE WHEEL.
APPLICATION FILED SEPT. 8, 1914.

1,220,314.

Patented Mar. 27, 1917.
2 SHEETS—SHEET 2.

WITNESSES
A. LeRoy Dietrich
Marjory D. Gray

Clement Booth
Alfred Charles Page
INVENTORS

BY
Charles N. Butler
ATTORNEY

UNITED STATES PATENT OFFICE.

CLEMENT BOOTH, OF NARBERTH, AND ALFRED CHARLES PAGE, OF PHILADELPHIA, PENNSYLVANIA.

DEMOUNTABLE WIRE WHEEL.

1,220,314.  Specification of Letters Patent.  Patented Mar. 27, 1917.

Application filed September 8, 1914. Serial No. 860,575.

*To all whom it may concern:*

Be it known that we, CLEMENT BOOTH, a citizen of the United States, residing at Narberth, in the county of Montgomery, and ALFRED CHARLES PAGE, a British subject, residing at Philadelphia, in the county of Philadelphia, both in the State of Pennsylvania, have jointly invented certain Improvements in Demountable Wire Wheels, of which the following is a specification.

This invention is comprised in a wheel having a hub provided with interlocking inner and outer members, the inner adapted to be mounted on a spindle or axle and the outer laced to a rim, in combination with means for holding the outer on the inner member, and means for locking and unlocking the holding means.

The characteristic features of the improvements are fully set forth in the following description and claims.

Figure 1:
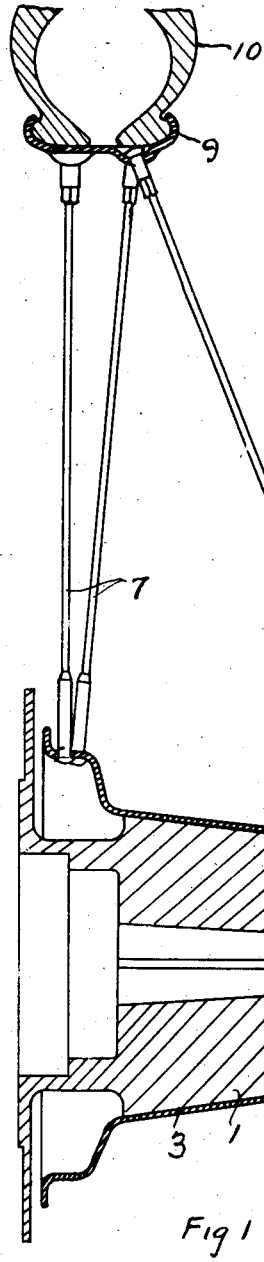
Figure 3:
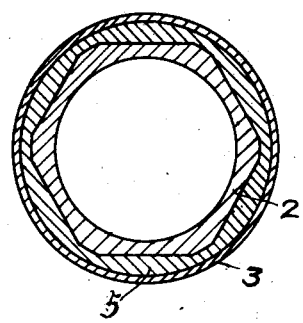
Figure 2:
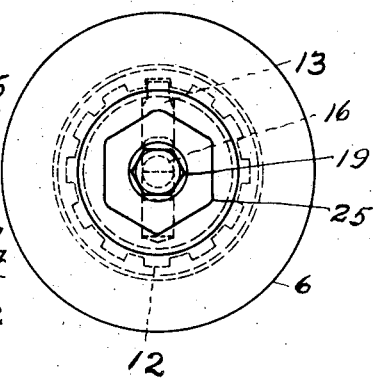
Figure 4:
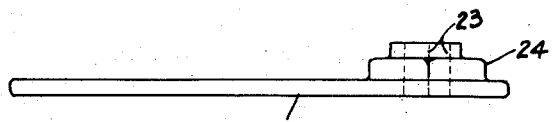
Figure 5:
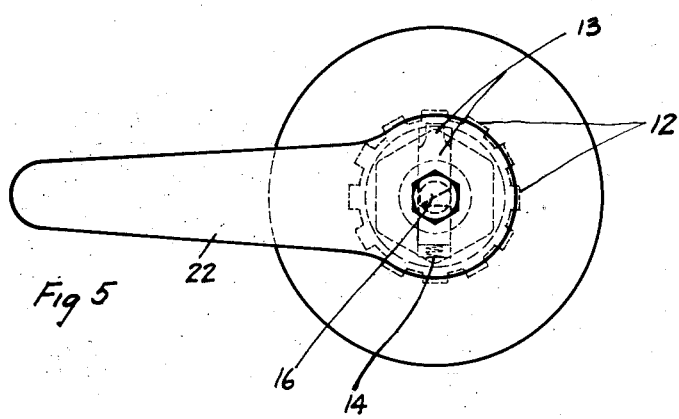
Figure 6:
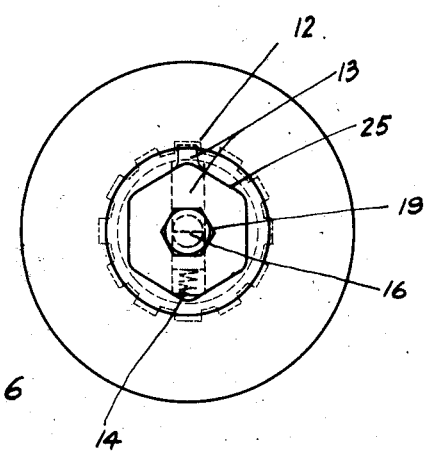

In the accompanying drawings, Figure 1 is a sectional elevation of a part of a wheel comprising the invention; Fig. 2 is an end elevation of the hub shown in Fig. 1; Fig. 3 is a sectional view taken on the line A—A of Fig. 1; Fig. 4 is a side view of a wrench for unlocking the holding means; Fig. 5 shows the unlocked relation of the parts; and Fig. 6 shows the locked position of the mechanism.

The construction illustrated in the drawings comprises the tapered hub body 1 having the substantially hexagonal male section 2, the tapered outer member or shell 3 sleeved on the body of the hub and the coordinate outer member or ring 4 abutting against the member 3 and having the substantially hexagonal female section 5 telescoped on the section 2, the closely engaging hexagonal sections interlocking so that the engaging parts are incapable of turning independently.

A cap 6 is screwed on the outer and smaller end of the member 1 and engages the ring 4, the members 3 and 4 being either fixed together or separable as desired. The members 3 and 4 are connected by the wire spokes 7 and 8 with the rim 9 which carries the tire 10.

The cap 6 has fixed therein the housing or guide way 11 adapted to lie within the internal notches 12 of the member 1. This housing carries a bolt 13 and a spring 14 in a way 15 thereof, the spring acting to throw the bolt outward and hold it in engagement with a notch to lock the cap in position on the hub. A cam stud 16 is fixed to the rings 17 and 18 having the hexagonal head 19 fixed thereto, the rings and stud being journaled in the cap and housing and the ring 17 being engaged in a circular channel 20 to hold the parts against axial movement. The cam end of the stud 16 is adapted to turn in a recess 21 of the bolt and to draw back the bolt by engagement with the wall of the recess, thereby unlocking the cap 6.

A wrench 22 is provided with a hexagonal socket 23 adapted for engaging the head 19 and a hexagonal hub 24 adapted for engaging the hexagonal recess 25 of the cap 6 in which lies the head 19.

When the hub body 1 has the cap 6 locked thereon by the engagement of the bolt 13 with a notch 12, the head 19 occupies the angular position with relation to the angular socket 25, as shown in Fig. 6. When the cap is to be detached, as for the purpose of demounting the wheel, the part 23 of the wrench is engaged on the head 19, which is turned until its sides are parallel with the sides of the socket 25. In this position, the bolt 13 is in the withdrawn position, out of engagement with the notches 12, and the hub 24 can be inserted in the socket 25 to unscrew the cap 6 while holding the bolt withdrawn.

The foregoing structure, having the inner hub section 2 interlocked with the outer hub section 4 and the outer spokes 8 fixed to the outer hub section 4, provides a simple, strong and effective means for driving from the hub 1 through the section 4 and the outer spokes 8, which permits the outer hub section 3 to be made light so that there is economy of manufacture as well as adaptability for securing a ready fit simply and the outer hub section 4 to be made heavy, with consequent provision of simple as well as stout means for driving, with avoidance of the liability to fracture prevailing in prior constructions driving through a light outer section connected with the inner row of spokes.

Having described our invention, we claim:

1. A demountable wheel comprising a hub provided with an inner member and an outer member formed of sections telescoped on said inner member, the outer end of said inner member and the outer section of said outer member being connected in interlocking relation, and spokes connected with the respective sections of the outer member, said inner member driving through the outer section of said outer member and the spokes connected therewith.

2. A demountable wheel comprising a tapered inner member having a locking section adjacent to its smaller end, a tapered outer member telescoped on said inner member, a second outer member telescoped on said inner member into abutting relation with said outer member first named, said second outer member having a section interlocking with said locking section and a part fitting within said outer member first named, and a cap screwed on said inner member into abutting relation with said outer member second named.

3. A demountable wheel comprising a hub provided with an inner member and an outer member formed of sections telescoped on said inner member, the outer end of said inner member and the outer section of said outer member being connected in interlocking relation, means comprising a cap provided with a bolt locked to said inner member for holding said outer section thereon, and spokes connected with the respective sections of the outer member, said inner member driving through the outer section of said outer member and the spokes connected therewith.

4. A demountable wheel comprising a hub having a recessed inner member provided with one or more notches, an outer member interlocked with said inner member, a cap having an angular socket and having a threaded connection with said inner member, a bolt carried by said cap and adapted to engage a notch of said inner member, a spring carried by said cap and adapted for effecting the engagement of said bolt with said notch, and a device journaled in said cap and adapted for retracting said bolt against the action of said spring, said device having an angular head whereby it is adapted to be turned.

5. A demountable wheel comprising a pair of interlocking members connected in telescoped relation, a cap having a threaded engagement with one of said members and adapted to hold one of said members on the other, said cap having an angular socket, mechanism carried by said cap for locking it, a device journaled in said cap for moving said mechanism, said device having an angular head in said socket, and a wrench adapted for engaging said head to turn said device so as to unlock said mechanism and for engaging said socket to turn said cap upon unlocking said mechanism.

In testimony whereof we have hereunto set our names this 18th day of August, 1914, in the presence of the subscribing witnesses.

CLEMENT BOOTH.
ALFRED CHARLES PAGE.

Witnesses:
  Jos. G. DENNY, Jr.,
  C. N. BUTLER.